US010831379B2

(12) United States Patent
Hodes et al.

(10) Patent No.: US 10,831,379 B2
(45) Date of Patent: Nov. 10, 2020

(54) METHOD FOR ENHANCING SSD ENDURANCE BY UTILIZING HOST DRAM

(71) Applicant: Western Digital Technologies, Inc., San Jose, CA (US)

(72) Inventors: Avichay Hodes, Kfar Ben-Nun (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 38 days.

(21) Appl. No.: 16/175,166

(22) Filed: Oct. 30, 2018

(65) Prior Publication Data

US 2020/0133512 A1 Apr. 30, 2020

(51) Int. Cl.
*G06F 12/00* (2006.01)
*G06F 3/06* (2006.01)

(52) U.S. Cl.
CPC .......... *G06F 3/0616* (2013.01); *G06F 3/0647* (2013.01); *G06F 3/0688* (2013.01)

(58) Field of Classification Search
CPC ..... G06F 3/0616; G06F 3/0647; G06F 3/0688
USPC ........................................................ 711/103
See application file for complete search history.

(56) References Cited

U.S. PATENT DOCUMENTS

| 10,175,892 | B1* | 1/2019 | Kim ..................... G06F 11/1072 |
| 2016/0335006 | A1* | 11/2016 | Rose ..................... G06F 3/0679 |
| 2017/0083454 | A1* | 3/2017 | Ramalingam ........... G06F 3/061 |
| 2017/0131948 | A1* | 5/2017 | Hoang .................. G06F 3/0653 |
| 2018/0260145 | A1* | 9/2018 | Margetts ............... G06F 3/0604 |

* cited by examiner

*Primary Examiner* — Mardochee Chery
(74) *Attorney, Agent, or Firm* — Patterson & Sheridan, LLP; Steven H. Versteeg

(57) ABSTRACT

The present disclosure generally relates to methods for enhancing solid state drive endurance by utilizing host memory capabilities. Such use of host memory capabilities increases solid state drive service life and limits errors that may develop over time. Example embodiments are disclosed that should not be considered limiting.

20 Claims, 2 Drawing Sheets

METHOD FOR ENHANCING SSD ENDURANCE BY UTILIZING HOST DRAM

BACKGROUND OF THE DISCLOSURE

Field of the Disclosure

Embodiments of the present disclosure generally relate to a methods and apparatus to increase endurance of solid state drives. More specifically, aspects of the disclosure relate to methods and apparatus to utilize host memory to enhance solid state drive endurance.

Description of the Related Art

Solid state drives are becoming more prevalent in computer systems. As the solid state drive market continues to grow, there is a desire to produce solid state drives at a cost effective rate.

As the technology for solid state drives increases, manufacturers seek to decrease the costs of solid state drives through whatever means are necessary. One of the methods to reduce the overall cost of solid state drives is to use cheaper (more economical) materials in the construction of such drives as well as a cheaper NAND class. Another method to reduce the overall cost of solid state drives is to share resources, such as memory on a host side.

Costs differ for solid state drives that use different types of memory technology. Often there is a trade-off between latency and the number of uses in the design of a solid state drive. If a very low latency is required in the design of a component, a specific type of memory device may be used. Such specific types of memory devices may, however, have a limited number of possible uses before the technology becomes ineffective. Other types of memory devices have a high number of potential uses and a low relative cost, however the latency in the system can be much higher. System engineers, therefore, have significant tradeoffs that must be done in designing such systems.

Current technology offerings for computer and server manufacturers provide dynamic random access memory ("DRAM") that provides memory capacities for computer functions. Such DRAM, however, is extremely expensive compared to memory technologies used in SSD bulk storage.

There has been an attempt by solid state drive manufacturers to incorporate DRAM into SSD systems, however, such incorporation technologies can drastically increase the cost of the SSD system.

There is a need to provide SSD bulk storage capabilities that function with low latency.

There is a need to provide SSD bulk storage capabilities that have low cost.

There is a need to provide SSD bulk storage capabilities that are superior to current conventional offerings.

SUMMARY OF THE DISCLOSURE

The present disclosure generally relates to methods for enhancing solid state drive endurance by utilizing host DRAM capabilities. Such use of host DRAM capabilities increases solid state drive service life and limits errors that may develop over time. Example embodiments are disclosed that should not be considered limiting.

In one embodiment, a method to enhance an endurance of a solid state drive is described comprising: scanning memory units of the solid state drive to obtain statistics for the memory units, comparing the statistics of the scanned memory units of the solid state drive to threshold values and copying data from a scanned memory unit of the solid state drive to a computer memory when one of the statistics for the memory units exceed the threshold values.

In another example embodiment, an arrangement to enhance an endurance of a solid state drive is disclosed comprising: means for scanning memory units of the solid state drive to obtain statistics for the memory units, means for comparing the statistics of the scanned memory units of the solid state drive to threshold values and means for relocating data from a scanned memory unit of the solid state drive to a computer memory when one of the statistics for the memory units exceed the threshold values.

In another example embodiment, a method to enhance an endurance of a solid state drive is disclosed comprising obtaining statistics on data within memory units of the solid state drive pertaining to usage of the data over time, comparing the statistics of the scanned memory units of the solid state drive to threshold values and relocating data from a scanned memory unit of the solid state drive to a computer memory when one of the statistics for the memory units exceed the threshold values.

In a further example embodiment, an arrangement to enhance an endurance of a solid state drive is disclosed comprising: means for obtaining statistics on data within memory units of the solid state drive pertaining to usage of the data over time, means for comparing the statistics of the memory units of the solid state drive to threshold values, means for relocating data from solid state drive when one of the statistics for the memory units exceed the threshold values and means for storing the relocated data from the solid state drive.

In a further example embodiment, a method to enhance an endurance of a solid state drive is disclosed comprising: scanning memory units of the solid state drive to obtain statistics for the memory units; comparing the statistics of the scanned memory units of the solid state drive to threshold values and relocating data from a scanned memory unit of the solid state drive to a computer memory when one of the statistics for the memory units exceed the threshold values, wherein the relocating data from the scanned memory unit of the solid state drive is accomplished through a host memory buffer non-volatile memory operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
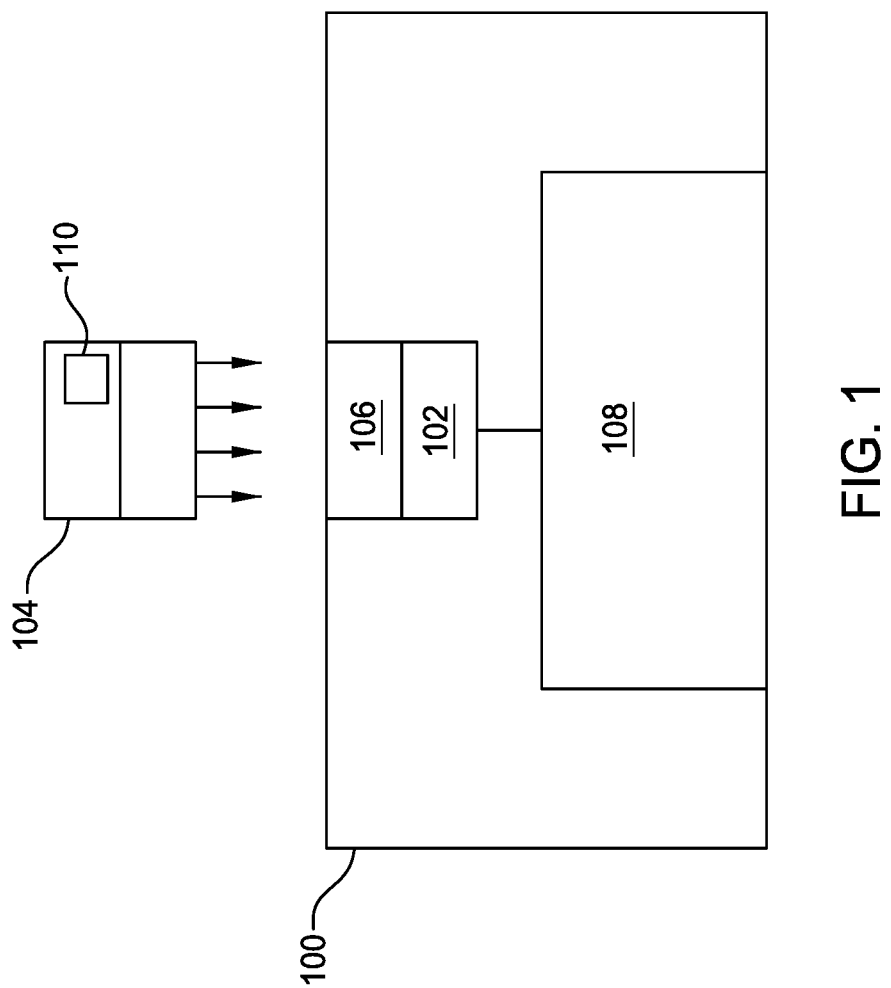
FIG. 1 is a diagram of a host and connected SSD in operation.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

The aspects of the description apply to computers and more specifically, aspects of controlling computers or computer connected devices such that the devices perform in an optimal method of operation. The aspects described relate to a host that interacts with other devices, such as a data storage arrangement. Data storage arrangements may be, for example, solid state drives and other similar arrangements.

In the embodiments described, a data storage arrangement is connected to a host system through an interface. The host system, in the illustrated embodiment, is an enterprise computer or a server so the computer may transmit and receive data from a data storage arrangement. The function of the data storage arrangement is to accept and store data until the data is needed by a user or the host. The data storage arrangement may have to accept large bursts of data at a rapid pace, depending on the computer processes performed, therefore the data storage arrangement is configured with multiple memory units, formed into arrays, that provide for various states of usage. Dies may write data to the arrays, as necessary, to complete the memory storage functions.

Certain sections of the data storage arrangement may be configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. The data storage arrangement, with the specific arrays, may therefore be configured from single level or multi-level cell arrangements. The data storage arrangement may have an interface that allows the data storage arrangement to connect with the host and allow for synchronization of the host and the data storage arrangement. The interface may be a PCie/NVMe compatible interface, as a non-limiting embodiment. The memory storage may have a configuration to allow for plug and play ability.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

A controller is provided to control actions of the solid state drive as required by the host. The controller may also be configured to perform maintenance activities for the solid state drive to allow for efficient use. The controller may be provided with code that interfaces with the internal software of the solid state drive to allow the controller to perform the various functions required. The controller, for example, may interact with the dies of the solid state drive to allow for reading or writing of data to the solid state drive.

Aspects of the disclosure relate to using host system memory or DRAM for certain functions that are performed by SSD NAND. In some applications, SSD NAND has significant drawbacks. One such drawback is for the number of times that the NAND may be used. NAND comes in different types and continual use of the same section of NAND may "wear out" such NAND. These areas are commonly known as "hot spots" were the data that is present on the NAND is continually needed for processing.

In one example embodiment, the host memory buffer (HMB) non-volatile memory express (NVMe) feature may be used to relocate hot-spot locations from the NAND to other, more suitable locations, such that the NAND is not worn to unacceptable levels.

By transferring data from such hot spots to the host memory buffer, there is no need to continually write and erase to a specific spot on the NAND, therefore increasing the overall life span of the NAND. By utilizing the host memory buffer, latency can be improved as well, resulting in a faster and more efficient processing of information. For definitional purposes, transfer of data is understood to mean the identification, copying of the data to a second place (system memory) and then erasing the data on the originating section of NAND. In place of the erased area of NAND, a marker or other type of notation may be made such that programs trying to access the data located at that location are relocated to the new location in system NAND.

A hot-spot is identified in order to allow the data to be transferred from the hot spot to a host memory buffer. An example of a hot spot is a logical block address (LBA) range that is frequently addressed by the host. The type of data may be related, for example, to a file system or operating system management data which is frequently updated. A threshold per unit time may be used to determine the presence of a hot spot. As a non-limiting example, if a position in the NAND is accessed more than 100 times per day, then the data (and position) in the NAND is associated with a hot spot and therefore is a candidate for transfer to system memory.

As can be understood, a number of different hot spots may be identified in NAND. To that end, according to the threshold per unit time value, more or less hot spots may be defined. In one example embodiment, the different number of hot spots may be tabulated and ranked. According to the ranking, the hot spots may be transferred to system memory. In one example ranking, the ranking may take into account the number of times a piece of data is accessed and if the data is accessed more than other pieces of data, then the ranking of the data is higher than others.

In other ranking schemes, ranking may be accomplished by size of the data to be moved. Therefore, after the identification of a hot spot, the larger sizes of data to be moved take precedence over small amounts of data or hot spots, therefore preserving larger areas of NAND compared to small individual chunks of NAND.

The types of data may also vary that are associated with a hot spot. In another example embodiment, an internal hot spot may be identified. An internal hot spot may be identified where specifically designated sections may be related to SSD firmware itself. This data may need to be repeatedly accessed in order for the SSD to function, therefore failure of the NAND in this section is of a more serious consequence. For example, entering a low power state could trigger a large amount of written data. In some devices, which using the power state in an aggressive manner, there could be a problem of very endurance consumption, even to the level of wearing out the NAND.

Once the hot spot has been identified, the data related to the hot spot may be relocated such that the memory arrangements of the SSD are not continually worn in the hot spot. In this embodiment, the SSD supports host memory buffer (HMB) NVMe feature, need to relocate the relevant data to the Host DRAM. From that point, any write that is attributed to this location, will be loaded on the host DRAM, which as a DRAM has unlimited endurance capability.

The choice of host memory may be determined by a controller based in the NAND. In some example embodiments, host memory chosen for transfer of the data may be non-volatile memory, therefore power loss to the host system and/or the SSD will not result in loss of data.

In instances when a host DRAM is used, if there is a need to deactivate power to the host DRAM, data can be transferred back to the NAND to allow for power safe operation. Once power safe operations are restored, the transfer of data can be accomplished a second time.

Optimal management of hot-spots, can significantly extend a device lifetime (endurance), by leveraging host DRAM endurance capability and releasing endurance bottle-necks. As the host DRAM has excess endurance capabilities compared to the SSD, utilizing this capability provides a better overall capability system wide.

Optimal management of hot-spots, can solve unexpected issues triggered by SSD firmware or the host that may wear-out the NAND endurance. And by applying this method, those can be mitigated on-the-fly.

Referring to FIG. 1, a schematic representation of a solid state drive 100 is illustrated. The solid state drive 100 is a unit that may be used in a computer or a server. The solid state drive 100 utilizes a memory to store information such that the information may be retrieved at the desire of a user. In the instant case, the solid state drive 100 uses a flash memory, such as a NAND flash memory 108. Although described as a NAND flash memory, other types of memory other than NAND flash may be used and the description of a NAND flash memory should not be considered limiting.

A controller 102 is provided in the solid state drive 100 to perform functional operations that are needed by a host 104. The host 104 sends information, such as a request to store data, to the controller 102 such that the instructions are received and processed by the controller 102. The controller 102 may be configured with an interface 106 to allow the controller 102 the ability to communicate with the host 104. The communication protocol between the controller 102 and the host 104 may be any protocol which allows for device bus mastering and supports a host memory buffer, such as PCIe/NVMe. Dual or multiple communication protocols are also within contemplation of the present disclosure.

The controller 102 may be a complicated design or a simple design when incorporated into the solid state drive 100. In an attempt to decrease the complexity of the controller 102, aspects presented herein attempt to minimize certain aspects or functions of the controller 102. By limiting the functions performed by the controller 102, the corresponding economic cost of the controller 102 is reduced, the controller 102 is more cost effective to manufacture and potential errors by the controller 102 are minimized.

A typical function of the controller 102 is to provide instructions and/or communication on the acceptance and routing of data to the NAND flash 108. The controller 102 in the illustrated embodiment is a "on chip" controller 102 where the control mechanism is placed on a computer chip that has been created for the purpose of providing instructions to other sections of the solid state drive 100 as well as provide for interface with the host 104. The controller 102 may be used to transfer data from the NAND to the host DRAM and back, as needed.

Aspects described herein accomplish the writing, reading and error checking responsibilities by using data latches and the NAND flash 108. For definition, a latch is defined, in one non-limiting embodiment, as a circuit that has two stable states and that is used to store information. The latch may be switched or flip-flopped, from one of the stable states to another through actuation. Such actuation will allow a different function to be performed or depending upon the configuration, a set of data (0 or 1) to be stored.

The host 104 is provided with DRAM 110 that provides memory for computer functions to be produced.

Figure 2:
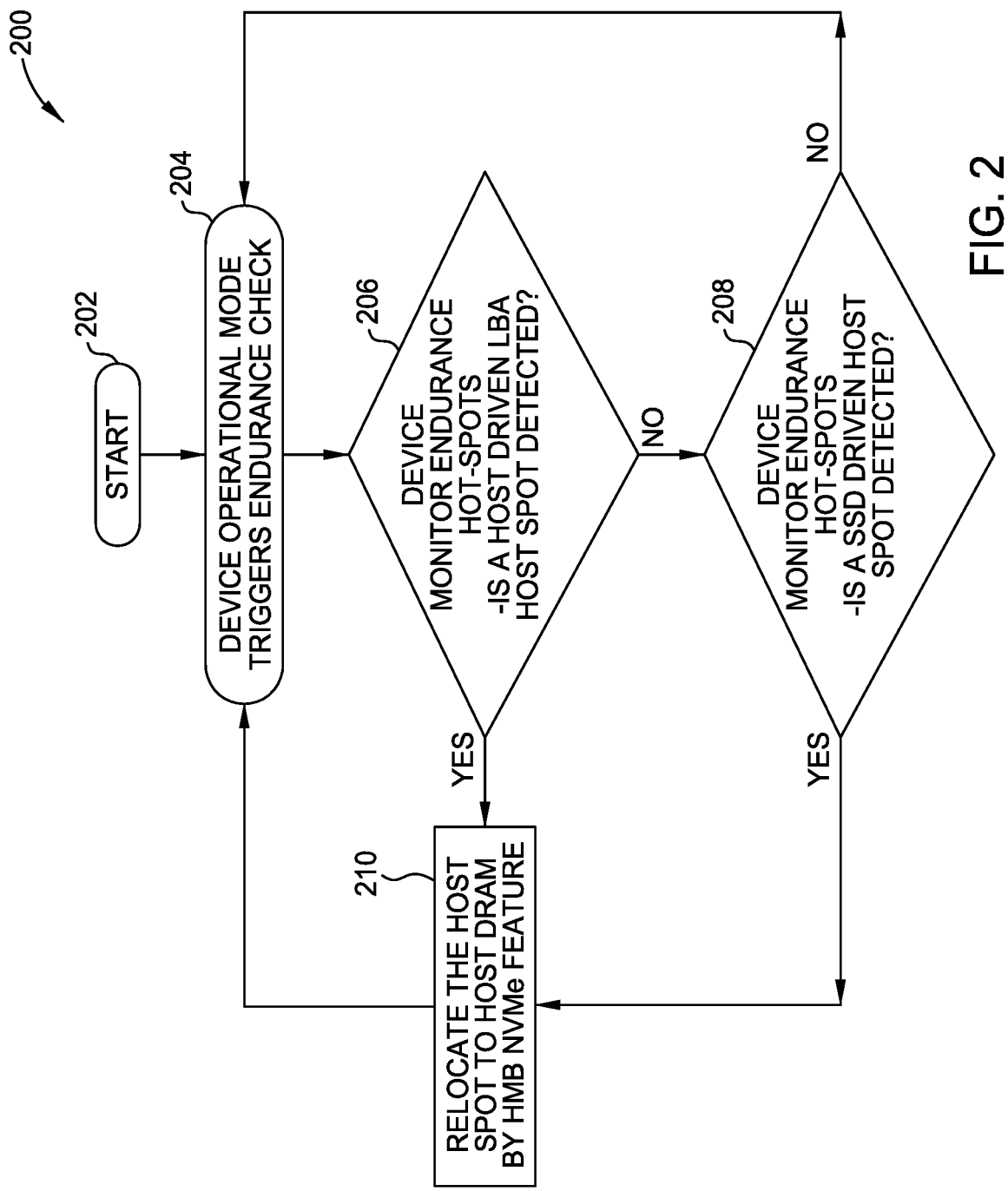
FIG. 2 is a flow cart for a method in conformance with an example embodiment of the disclosure.

Referring to FIG. 2, a method 200 is illustrated in conformance with one example embodiment of the disclosure. The method starts at 202 and then progresses to 204. At 204, an endurance check is triggered for the NAND. A review of the NAND is conducted at 204 and the method progresses to 206. The device then monitors endurance hot spots and performs a query to determine if a host driven logical based address hot spot is detected. If no hot spot is detected at the query at 206, the method then loops back to 204. If a hot spot is detected at 206, then the hot spot is relocated, at 210, to the host DRAM by the HMB NVMe feature. The method 200 then loops back to 204.

In one embodiment, a method to enhance an endurance of a solid state drive is described comprising: scanning memory units of the solid state drive to obtain statistics for the memory units, comparing the statistics of the scanned memory units of the solid state drive to threshold values and copying data from a scanned memory unit of the solid state drive to a computer memory when one of the statistics for the memory units exceed the threshold values.

In another example embodiment, the method may further comprise copying the threshold values to the solid state drive prior to the scanning of the memory units.

In another example embodiment the method may be performed wherein the threshold values are based on a number of uses per unit of time.

In another example embodiment, the method may be performed wherein the solid state drive is NAND based.

In another example embodiment, the method may be performed wherein the scanning of the memory units of the solid state drive is performed by a processor in a host.

In another example embodiment, the method may be performed wherein the scanning of the memory units of the solid state drive is performed by a processor in the solid state drive.

In another example embodiment, the method may be performed wherein the relocating is performed by a host memory buffer non-volatile memory feature.

In another example embodiment, an arrangement to enhance an endurance of a solid state drive is disclosed comprising: means for scanning memory units of the solid state drive to obtain statistics for the memory units, means for comparing the statistics of the scanned memory units of the solid state drive to threshold values and means for relocating data from a scanned memory unit of the solid state drive to a computer memory when one of the statistics for the memory units exceed the threshold values.

In a still further embodiment, the arrangement may further comprise means for copying the threshold values to the solid state drive prior to the scanning of the memory units.

In a still further embodiment, a method to enhance an endurance of a solid state drive, comprising: obtaining statistics on data within memory units of the solid state drive pertaining to usage of the data over time, comparing the statistics of the scanned memory units of the solid state drive to threshold values; and relocating data from a scanned memory unit of the solid state drive to a computer memory when one of the statistics for the memory units exceed the threshold values.

In a further example embodiment, the method may be performed wherein the statistics on data within memory units of the solid state drive pertaining to usage of the data over time relates to usage of the data by the solid state drive.

In further example embodiment, the method may be accomplished wherein the statistics on data within memory units of the solid state drive pertaining to usage of the data over time relates to usage of the data by a host.

In a further example embodiment, the method may further comprise copying the threshold values to the solid state drive prior to the obtaining statistics of the memory units.

In a further example embodiment, the method may be performed wherein the threshold values are based on a number of uses per unit of time.

In a further example embodiment, the method may be performed wherein the solid state drive is NAND based.

In a further example embodiment, an arrangement to enhance an endurance of a solid state drive is disclosed comprising: means for obtaining statistics on data within memory units of the solid state drive pertaining to usage of the data over time, means for comparing the statistics of the memory units of the solid state drive to threshold values, means for relocating data from solid state drive when one of the statistics for the memory units exceed the threshold values and means for storing the relocated data from the solid state drive.

In a further example embodiment, a method to enhance an endurance of a solid state drive is disclosed comprising: scanning memory units of the solid state drive to obtain statistics for the memory units; comparing the statistics of the scanned memory units of the solid state drive to threshold values and relocating data from a scanned memory unit of the solid state drive to a computer memory when one of the statistics for the memory units exceed the threshold values, wherein the relocating data from the scanned memory unit of the solid state drive is accomplished through a host memory buffer non-volatile memory operation.

In a still further embodiment, the method may be accomplished, wherein the relocating data from the scanned memory unit of the solid state drive to the computer memory when one of the statistics for the memory units exceed the threshold values, wherein the relocating data from the scanned memory unit of the solid state drive is accomplished through a host memory buffer non-volatile memory operation is performed by the controller.

In another non-limiting embodiment, the method may be accomplished wherein the threshold values are a number of writes per unit of time.

In a still further embodiment, the method may be accomplished wherein the threshold values are a number of reads per unit of time.

In another embodiment, the method may further comprise monitoring, during the method, for a power shut off during operations and transferring data from the host memory to the solid state drive when a power shut off during operations occurs, and wherein the copying of the data finishes prior to a complete power shut off.

In another non-limiting embodiment, the method may further comprise transferring data from the solid state drive back to the host memory when power is reestablished to the solid state drive and the host.

In another non-limiting embodiment, the method may be accomplished wherein the relocating data from the scanned memory unit of the solid state drive to the computer memory when one of the statistics for the memory units exceed the threshold values is tracked by a controller in the solid state drive.

While the foregoing is directed to embodiments of the present disclosure, other and further embodiments of the disclosure may be devised without departing from the basic scope thereof, and the scope thereof is determined by the claims that follow.

What is claimed is:

1. A method to enhance an endurance of a solid state drive, comprising:
    scanning memory units of the solid state drive to obtain statistics for the memory units accessed by a host, wherein the host is distinct from the solid state drive and wherein the host is coupled to the solid state drive, and wherein the host has a non-volatile memory;
    comparing host access statistics obtained during the scanning of the memory units of the solid state drive to threshold values; and
    relocating data from a scanned memory unit of the solid state drive to the host non-volatile memory when one of the statistics for the memory units exceed the threshold values.

2. The method according to claim 1, further comprising: copying the threshold values to the solid state drive prior to the scanning of the memory units.

3. The method according to claim 1, wherein the threshold values are based on a number of uses per unit of time.

4. The method according to claim 1, wherein the solid state drive is NAND based.

5. The method according to claim 1, wherein the scanning of the memory units of the solid state drive is performed by a processor in the solid state drive.

6. The method according to claim 1, wherein the relocating is performed by utilizing a host memory buffer feature.

7. A method to enhance an endurance of a solid state drive, comprising:

obtaining statistics on data access frequency within memory units of the solid state drive pertaining to usage of the data over time;

comparing the statistics of the memory units of the solid state drive to threshold values; and relocating data from solid state drive to a computer memory in a host when one of the statistics for the memory units exceed the threshold values, wherein the host is distinct from the solid state drive and wherein the host is coupled to the solid state drive.

8. The method according to claim 7, wherein the statistics on data within memory units of the solid state drive pertaining to usage of the data over time relates to usage of the data by the solid state drive.

9. The method according to claim 7, wherein the statistics on data within memory units of the solid state drive pertaining to usage of the data over time relates to usage of the data by the host.

10. The method according to claim 7, further comprising:
copying the threshold values to the solid state drive prior to the obtaining statistics of the memory units.

11. The method according to claim 7, wherein the threshold values are based on a number of uses per unit of time.

12. The method according to claim 7, wherein the solid state drive is NAND based.

13. A method to enhance an endurance of a solid state drive, comprising:

scanning memory units of the solid state drive to obtain statistics for the memory units;

comparing the statistics of the scanned memory units of the solid state drive to threshold values; and relocating data from a scanned memory unit of the solid state drive to a computer memory of a host when one of the statistics for the memory units exceed the threshold values, wherein the relocating data from the scanned memory unit of the solid state drive is accomplished through a host memory buffer non-volatile memory operation, wherein the host is distinct from the solid state drive and wherein the host is coupled to the solid state drive.

14. The method according to claim 13, wherein the relocating data from the scanned memory unit of the solid state drive to the computer memory when one of the statistics for the memory units exceed the threshold values, wherein the relocating data from the scanned memory unit of the solid state drive is accomplished through a host memory buffer non-volatile memory operation is performed by the controller.

15. The method according to claim 13, wherein the threshold values are a number of writes per unit of time.

16. The method according to claim 13, wherein the threshold values are a number of reads per unit of time.

17. The method according to claim 13, further comprising:
monitoring, during the method, for a power shut off during operations; and
transferring data from the host memory to the solid state drive when a power shut off during operations occurs, and wherein the copying of the data finishes prior to a complete power shut off.

18. The method according to claim 17, further comprising:
transferring data from the solid state drive back to the host memory when power is reestablished to the solid state drive and the host.

19. The method according to claim 18, wherein the relocating data from the scanned memory unit of the solid state drive to the computer memory when one of the statistics for the memory units exceed the threshold values is tracked by a controller in the solid state drive.

20. The method according to claim 13, wherein the computer memory is a non-volatile memory.

* * * * *